Sept. 28, 1965     R. E. SMITH     3,208,160
AID FOR KEY PUNCH OPERATORS
Filed April 3, 1962     6 Sheets-Sheet 1
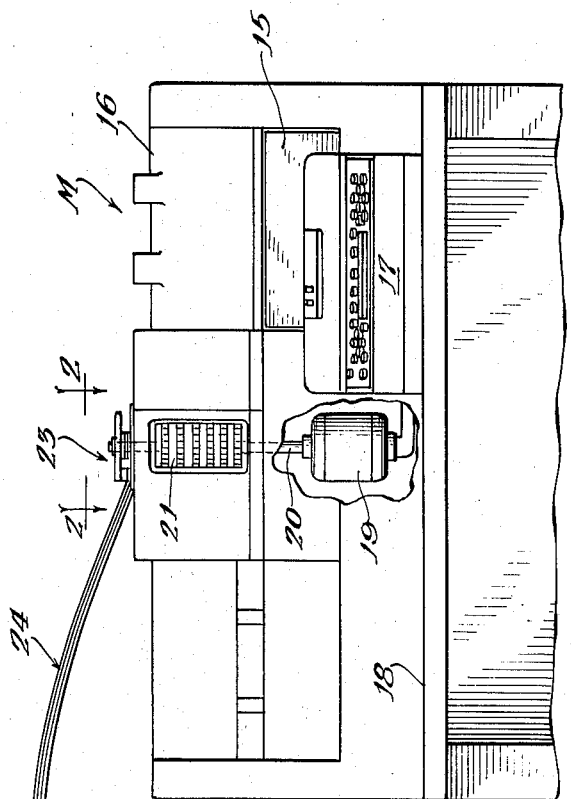
Inventor:
Ralph E. Smith
By: Hofgren, Brady, Wegner,
Allen & Stellman
Attorneys

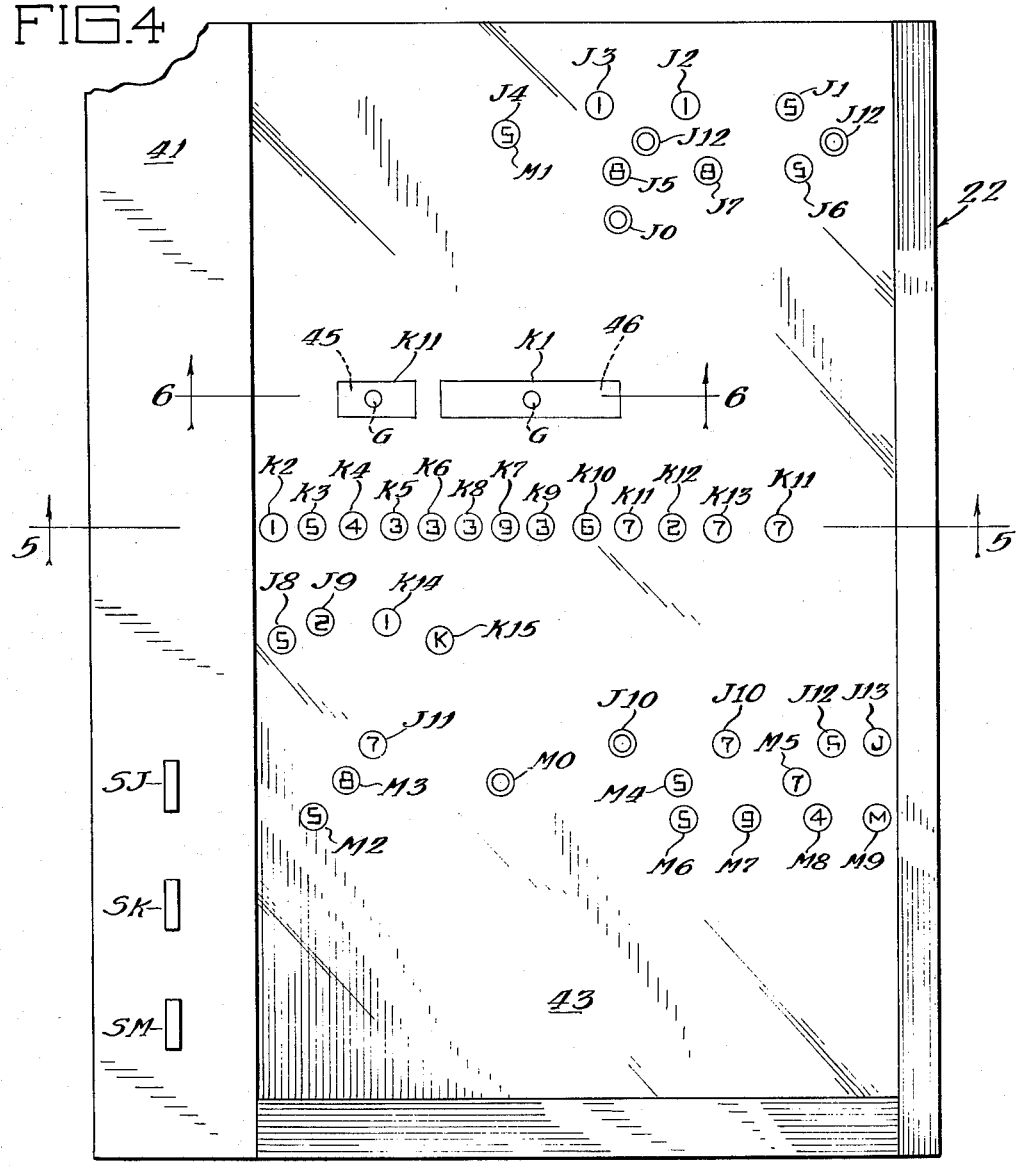
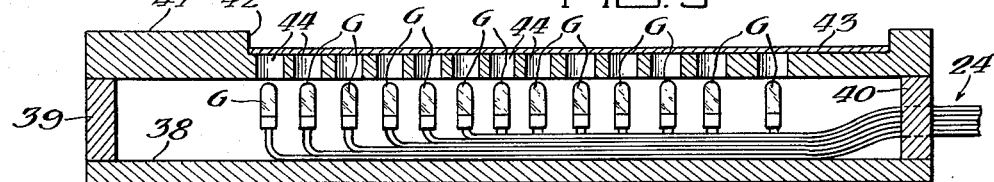
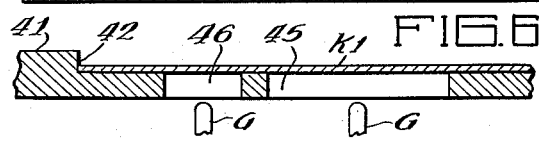

Sept. 28, 1965　　　　R. E. SMITH　　　　3,208,160
AID FOR KEY PUNCH OPERATORS
Filed April 3, 1962　　　　　　　　　　6 Sheets-Sheet 3
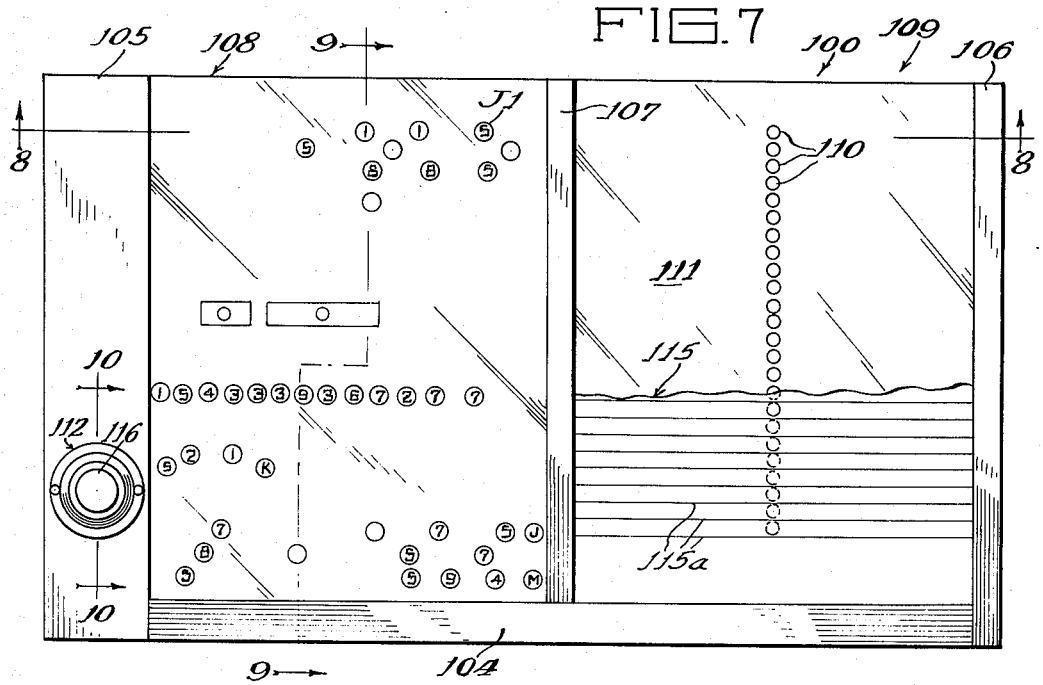
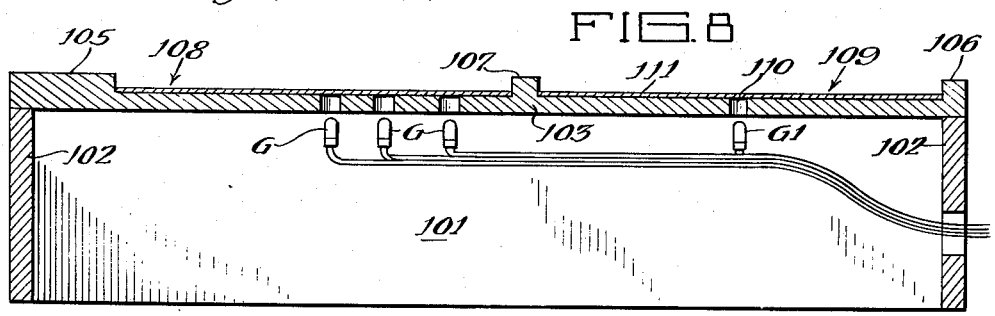
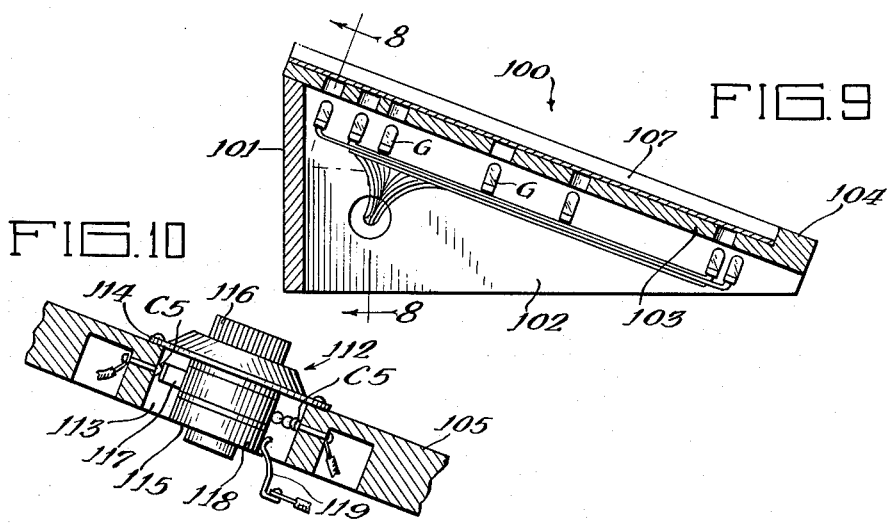
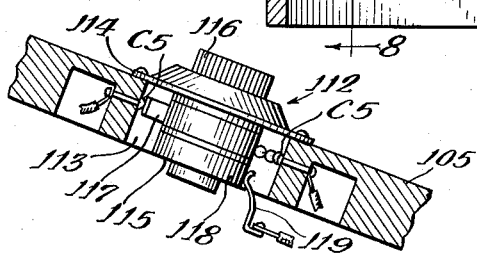

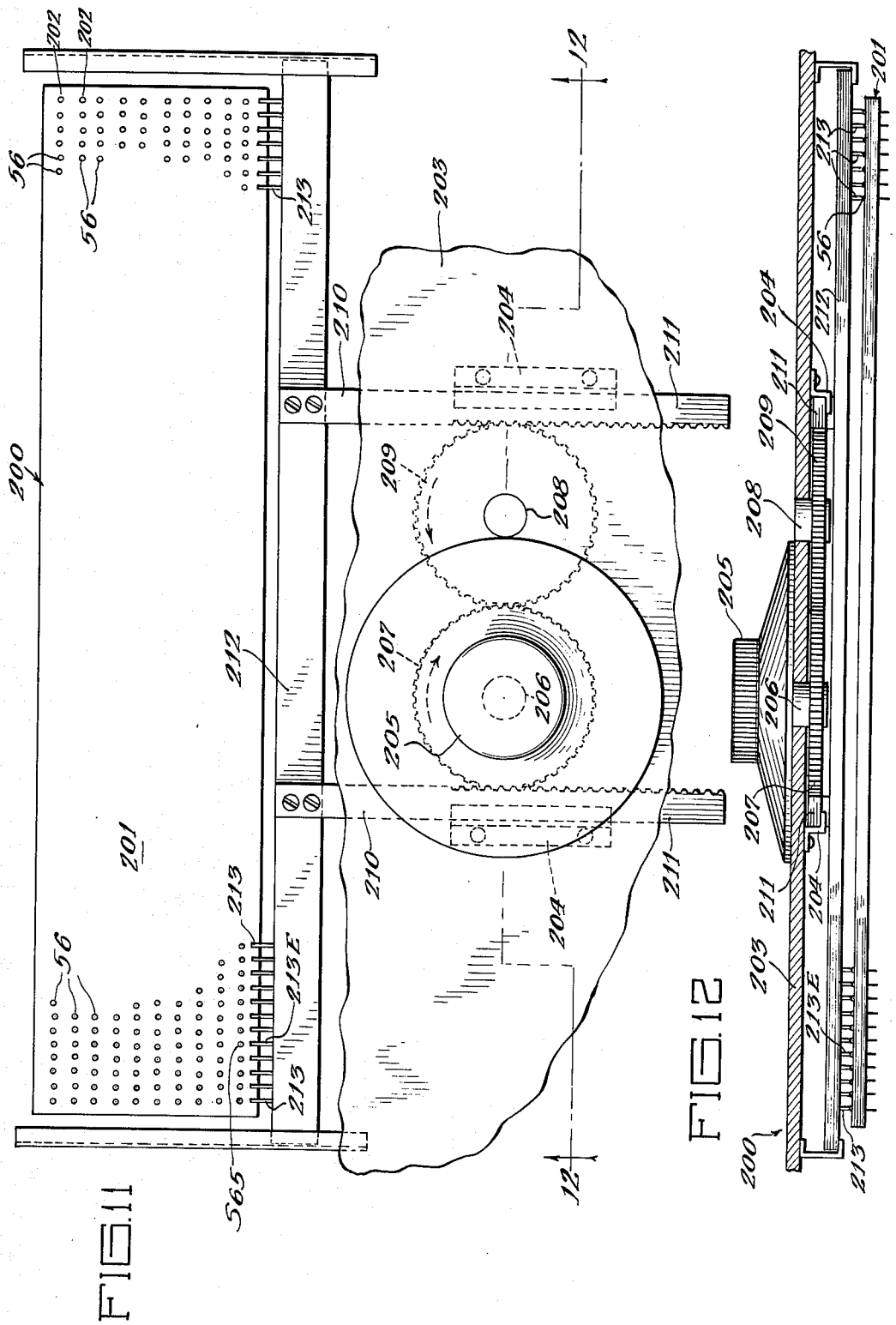

Sept. 28, 1965　　　　　　　　R. E. SMITH　　　　　　　　3,208,160

AID FOR KEY PUNCH OPERATORS

Filed April 3, 1962　　　　　　　　　　　　　　　　6 Sheets-Sheet 6

FIG. 14

| FORM CCC GRAIN-30 (D.P.C.) (2-1-60) | COMMODITY DELIVERY NOTICE | U. S. DEPARTMENT OF AGRICULTURE COMMODITY STABILIZATION SERVICE COMMODITY CREDIT CORPORATION |

*D*

| (NAME AND MAILING ADDRESS OF PRODUCER) | YEAR PROD. *J3* | COMMODITY *J2* | ST. & CO. CODE & LOAN OR P/A NO. *J1* |
|---|---|---|---|
| *J4* *M1* | Weed control *J12* discount is applicable ☐ | Voluntary early delivery subject to storage deduction ☐ | Non-cooperator *J12* rate is applicable ☐ |
| | OUTSTANDING QUANTITY *J5* | BAL. TO BE SETTLED $ *J7* | DISBURSEMENT DATE *J6* |

SECTION 1 - DELIVERY INSTRUCTIONS　*J0*

LOAN ☐

You are hereby instructed to deliver to the storage point indicated, by the date shown, the commodity described herein You may deliver to the storage point indicated, by the date shown, the commodity described herein. Delivery may not be in excess of quantity indicated.

PUR-CHASE AGREE. ☐

| WAS COMMODITY ELIGIBLE ON THE BASIS OF PRE-DELIVERY INSPECTION? YES ☐ NO ☐ | IF "NO", SPECIFY LOCATION OF STORAGE STRUCTURE(S) |

| SEAL NO.(S) (A) | QUANTITY TO DELIVER (BU., CWT., LB.) (B) | SEAL NO.(S) (A) | QUANTITY TO DELIVER (BU., CWT., LB.) (B) | SEAL NO.(S) (A) | QUANTITY TO DELIVER (BU., CWT., LB.) (B) |
|---|---|---|---|---|---|
| | | | | | |

| DELIVER TO (NAME, CODE NO. & LOCATION OF WHSE. OR OTHER APP'D STORAGE) COMMODITY CREDIT CORPORATION *K1* *K11* | WEIGH AT | FINAL DATE TO DELIVER |
|---|---|---|
| | NAME AND ADDRESS OF ASC COUNTY COMMITTEE | |

BY:　　　　　　　　　　　　　　　　DATE:

SECTION 2 - GRADE AND QUANTITY CERTIFICATION - If additional space needed, use Form CCC Grain-52

The undersigned hereby certify (1) that a representative sample was secured from each lot of the commodity described above at the time it was delivered, (2) that it is mutually agreed such commodity graded as indicated in the schedule below, and on continuation sheets thereto, (3) the warehouseman certifies that he will issue acceptable warehouse receipt(s) for the commodity accepted for local storage, and scale tickets when requested, for the quantity and grade(s) set forth in the schedule below, and on continuation sheets thereto.

| WAREHOUSE RECEIPT NO. OR LOT NO. 1/ (A) | GRADE, CLASS & SUB-CLASS 2/ (B) | TEST WT. (LB.) (C) | MOIS. (%) (D) | F. M. (%) 3/ (E) | OTHER APPLICABLE FACTORS (INCLUDING PROTEIN) 2/ (F) | GROSS WEIGHT (LB.) (G) | DOCK (%) (H) | NET (BU., CWT., LB.) (I) | STORAGE START DATE (J) | ✓ 4/ MD MP (K) | SPEC. SETTLE. RATE (L) |
|---|---|---|---|---|---|---|---|---|---|---|---|
| *K2 K3* | *K4* | *K5* | *K6* | *K8* | (*K7*) (*K9*) (*K10*) | *K11* | *K12* | *K13* | *K11* | | |
| | | | | | | | | | | | |

1/ If undesirable wheat variety, place an "*" following applicable lot identity.
2/ If in disagreement, execute Section 6 on reverse.
3/ For corn this includes broken corn as well as foreign material.
4/ If applicable, check: MD-Market Discount or MP-Market Price.

| DATE DELIVERY COMPLETED *J8 J9* | TYPE OF DELIVERY WHSE. STOR. ☐ HAND. ONLY ☐ *K14 K15* SALE ☐ TRACK LOAD ☐ BINS ☐ | LOADING ORDER NO. | NAME, CODE NO. & LOCATION OF WAREHOUSE |
|---|---|---|---|
| SIGNATURE OF PRODUCER | | DATE | BY　　　　　　DATE |

SECTION 3 - SETTLEMENT DATA

| ITEMIZE CHARGES (STORAGE, ETC.) *J12* | EXCISE TAX $ | ITEMIZE CREDITS (HAULING, TRACKLOADING, STORAGE ETC.) *J10*　　*J10* | RATE BASIS (ST. & CO. CODE) OR TERM. PT. *J12* (*J13*) |
|---|---|---|---|

| INELIGIBLE OVERRUN (BU., CWT., LB.) *M2* | SOLD BY COUNTY COMMITTEE TO (NAME AND ADDRESS) (*M0*) | AUTH. NO. (IF ANY) *M4* | QUANTITY SOLD (BU., CWT., LB.) *M5* |
|---|---|---|---|
| SETTLEMENT RATE (INELIG. OVERRUN) *M3* | LOT IDENT. NO. | | RATE $ *M6* | AMOUNT $ *M7* | CCC-257 NO. *M8* (*M9*) |

SECTION 4 - WEIGHTS OF LOADS RECEIVED AT CCC BIN SITES (Pounds) If additional space is needed, use Form CCC Grain 53

| LOAD NO. | DATE DELIV. | GROSS | TARE | DIFFERENCE OF GROSS AND TARE | DRIVER ON | OFF | LOT NO. | LOAD NO. | DATE DELIV. | GROSS | TARE | DIFFERENCE OF GROSS AND TARE | DRIVER ON | OFF | LOT NO. |
|---|---|---|---|---|---|---|---|---|---|---|---|---|---|---|---|
| 1 | | | | | | | | 7 | | | | | | | |
| 2 | | | | | | | | 8 | | | | | | | |

United States Patent Office 3,208,160
Patented Sept. 28, 1965

3,208,160
AID FOR KEY PUNCH OPERATORS
Ralph E. Smith, Chicago, Ill., assignor to Tab Products Co., San Francisco, Calif., a corporation of California
Filed Apr. 3, 1962, Ser. No. 184,776
12 Claims. (Cl. 35—5)

This invention relates to a device to guide an operator in recording data from a source document on a secondary document, the device being especially useful in the preparation of secondary documents in the form of data cards for machine information retrieval.

Data cards for machine retrieval of information, commonly known as punch cards, contain a large number of fields in which certain data must be recorded in orderly succession, from left to right on the cards. A card punch machine, commonly known as a key punch machine, is used to enter on the punch cards the data which is contained in a source document which ordinarily includes either type-written or hand-written information. Such source documents are of many different types and customarily the arrangement of data on the source document bears no relationship to the arrangement in which the same data must be entered on the punch card. Accordingly, the time required for a skilled operator to complete a punch card, and the time required for an operator of ordinary ability to become skilled, varies enormously depending upon the complexity of the source document with which the operator must work.

Some source documents are so complex that weeks of training are required for an average operator to learn to transfer data from them with any facility. The present invention guides an operator's eye to the correct area of a source document for the information which must be recorded in any particular field of the machine retrieval data card. Thus, it serves to speed the training of new operators, it permits the use of operators whose intelligence is insufficient to work from a complex source document without a visual aid, and it permits even a skilled operator to work faster and with less likelihood of error. Accordingly, the device of the present invention may be considered both as a training aid for operators and as an aid for regular use by trained operators. An important advantage of the device is that it permits an operator to move from one complex source document to a different one without a long retraining period.

The value of the device as a training aid has been proved experimentally in one office using a very complex source document. In one case, the device was used as a training aid for a new employee who was just beginning training, and who had displayed so little aptitude for the work as to be the lowest producer of all the new trainees. After working with the device of the present invention for one week she went back to preparing machine retrieval data cards without the help of the invention, and her production had increased so rapidly that within a very short time she was producing above the average of the best new trainees who had not been trained with the present device.

Another experiment was run with a trained operator whose regular production on the same complex source document was considerably below average. She worked with the device of the present invention for two days and then returned to regular production not using the device. The first week after training with the device there was a 35% increase in her output of work.

Briefly, the device of the present invention has a panel to receive a source document, and a plurality of electrical guide lights which are arranged in a pattern corresponding to the location of data on the source document. An electrical stepping switch is driven by the key punch machine to successively illuminate the guide lights as punch card preparation proceeds, so as to attract the operator's eye to the particular area of the source document from which data is to be recorded on the data card at any given time.

In a modification of the device which may be used for the hand entry of data on successive lines of a secondary document such as a listing sheet, a board is positioned immediately adjacent the source document panel and has a plurality of columnar electric lights, each of which indicates a line of the listing sheet in which data must be entered. By manually moving an electrical stepping switch the operator simultaneously illuminates one of the columnar lights and the guide lights on the source document from which she is able to determine immediately the areas of the source document from which information for the listing sheet must be obtained.

The principal object of the invention, therefore, is to provide a device to guide an operator in recording data from a source document on a secondary document, and which may be used either as a training device or as a permanent adjunct to the recording of such data to permit more rapid and accurate operation.

Another object of the invention is to provide a device by means of which the attention of an operator is directed to the particular area of a complex source document from which data must be obtained for recording on a secondary document.

Still another object of the invention is to provide a device which is used directly in conjunction with the key punch machines on which machine information retrieval data cards are punched.

Still another object of the invention is to provide a device which may be used in conjunction with line listing sheets on which information or data is recorded in orderly succession from random areas of a source document.

Yet another object of the invention is to provide a device having a multiple switchboard and a multiple plug board which make it possible to change the sequence of operation of the device very quickly and easily to adapt it to use with different complex source documents.

The invention is illustrated in a preferred and alternative embodiment in the accompanying drawings in which:

FIGURE 1 is a fragmentary front elevational view, partially broken away, of a commercial key punch machine with the device of the present invention electrically connected therewith for use by an operator;

FIGURE 2 is a fragmentary rear elevational view on an enlarged scale, taken substantially as illustrated along the line 2—2 of FIGURE 1, showing an electrical stepping switch which is a part of the present invention;

FIGURE 3 is a sectional view taken substantially as illustrated along the line 3—3 of FIGURE 2;

FIGURE 4 is a plan view of a panel for a source document;

FIGURE 5 is a fragmentary section taken substantially as illustrated along the line 5—5 of FIGURE 4;

FIGURE 6 is a fragmentary section taken substantially as illustrated along the line 6—6 of FIGURE 4;

FIGURE 7 is a plan view of an alternative embodiment of the device which is used in preparation of line listing data sheets, with a fragmentary view of such a data sheet in position for entry of data;

FIGURE 8 is a sectional view taken substantially as illustrated along the line 8—8 of FIGURE 7;

FIGURE 9 is a sectional view taken substantially as illustrated along the line 9—9 of FIGURE 7;

FIGURE 10 is a fragmentary sectional view on an enlarged scale taken substantially as illustrated along the line 10—10 of FIGURE 7;

FIGURE 11 is a fragmentary plan view of a switch panel which is used in a further alternative embodiment of the device;

FIGURE 12 is a sectional view taken substantially as illustrated along the line 12—12 of FIGURE 11;

Figure 13:
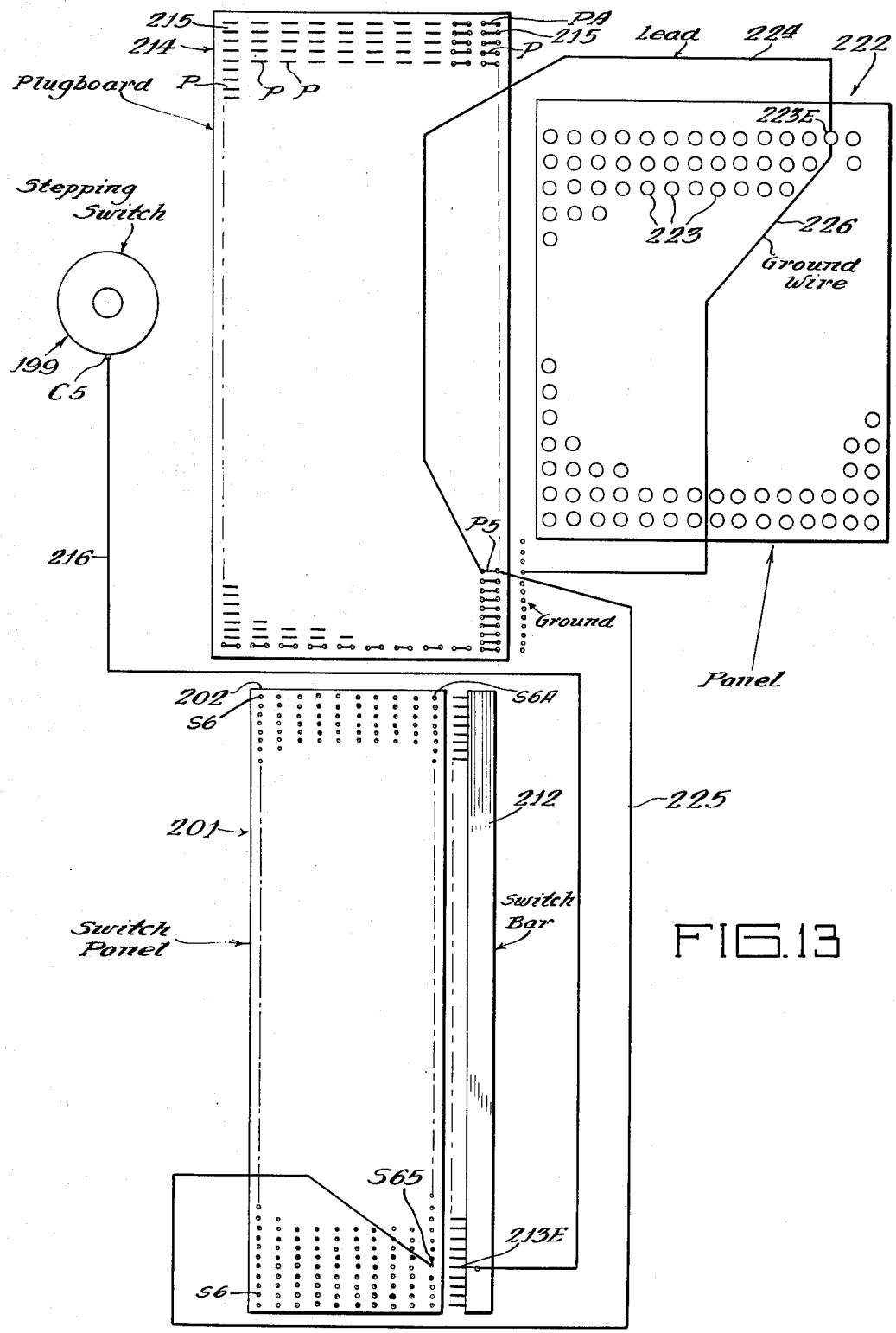

FIGURE 13 is a diagrammatic view illustrating the wiring connections for a single guide light of the device of the present invention, wired through a switch panel of the type illustrated in FIGURES 11 and 12 and through a plug board used in conjunction with the switch panel; and FIGURE 14 illustrates the particular complex source document with which the source document panel arrangement illustrated in FIGURES 4 and 7 is adapted to be used.

In considering the present disclosure, it is to be understood that the particular source document panel arrangement illustrated in FIGURES 4 and 7 is custom built for use with the particular complex source document illustrated in FIGURE 14, and that other complex source documents of a different arrangement would require a totally different panel set-up.

Referring to the drawings in greater detail, and referring first to FIGURE 1, M indicates generally a machine, such as IBM card punch, or key punch machine, which is used to record data from a source document D (see FIG. 14) upon a secondary document 15 which is illustrated in FIGURE 1 as a machine information retrieval data card, or punch card. The machine M has a hopper 16 from which punch cards may be released one at a time to a punching station at which the card 15 is illustrated. The machine has a keyboard 17, a reading board 18 on which a source document D may be placed, a drive motor 19, and a program drum shaft 20 upon which a program drum 21 is mounted. When the machine is in operation the motor 19 rotates program drum shaft 20 to drive the program drum 21, and these elements control the position of the machine card punch elements (not shown) with respect to the punch card 15. The machine punch elements are standard operating components of any key punch machine, and thus form no part of the present invention.

The device of the present invention includes a source document panel, indicated generally at 22, which provides holding means for a source document D, a stepping switch, indicated generally at 23, which is mounted at the outer end of the program drum shaft 20, and electrical connections, indicated generally at 24, leading from stepping switch contacts C to guide lights mounted in the panel 22. Some of the guide lights are illustrated in FIGURE 5 in which each is given a reference letter G.

The guide lights G afford illuminating means for individually illuminating any of a large number of selected areas on a source document in the holding means provided by panel 22; while the stepping switch 23, in combination with the electrical connections 24, provides shifting means for sequentially shifting the illuminaton afforded by the illuminating means to illuminate selected areas of the source document D in predetermined sequence.

In FIGURE 1 the panel 22 which receives the source document is separated from the key punch machine M for clarity of illustration. In actual use the panel 22 would be placed upon the reading board 18 of the key punch machine.

The particular source document D illustrated in FIGURE 14 contains data which must be recorded on three different secondary documents, each of which is a separate punch card. This, of course, means that the stepping switch 23 must be provided with three separate sets of contacts, and the separate sets of contacts in the stepping switch must be wired into separate circuits in the panel 22. In actual practice the three different punch cards to receive data from the source document D are designated as a J, or leader card, a K, or collateral card and an M, or sale and ineligible overrun card; and accordingly, as seen in FIGURE 2, the stepping switch 23 is indicated as having one ring J of contacts C1, a ring K of contacts C2 and a ring M of contacts C3. Correspondingly, as seen in FIGURE 4, panel 22 has a manual switch SJ which is wired into a circuit including the contacts C1 of the stepping switch, a manual switch SK which is wired into a circuit that includes the contacts C2 of the stepping switch and a manual switch SM which includes the contacts C3 of the stepping switch.

The manual switches SJ, SK and SM, with their respective circuit connections to the rings J, K and M of contacts C1, C2 and C3, provide control means which control the shifting means to illuminate selected areas of the source document in any of a plurality of predetermined sequences.

As best seen in FIGURE 3 the stepping switch is of rather conventional construction and has a fixed contact base 25 which carries the three rings of contacts. On the program drum shaft 20 is a commutator hub, indicated generally at 26, which carries three commutator strips 27, 28 and 29 contacted, respectively, by brushes 30, 31 and 32. The brushes 30, 31 and 32 are respectively connected to a source of electric power by means of wires 30a, 31a and 32a. A rotating arm 33 surmounts commutator hub 26 so as to rotate with the drum and with the program drum shaft 20, and the arm 33 carries a finger bracket 34 on which are mounted contact fingers 35, 36 and 37 which are positioned to ride, respectively, upon the contacts C1, C2 and C3. Each of the contact fingers 35, 36 and 37 is electrically connected to one of the three commutator rings 27, 28 or 29, so that as the rotating arm 33 moves with the program drum shaft 20 the contact fingers, 35, 36 and 37 are carried over the series of contacts C1, C2 and C3; and the switches J, K and M on the panel 22 determine whether the contacts in the ring J, the ring K, or the ring M are energized at any given time.

A punch card of the type used for recording data from a source document such as the document D has 80 card columns which are numbered from one to eighty and are arranged side by side from left to right of the card. The columns are also classified into so-called "data fields," with any particular field containing anywhere from one to eight or nine card columns. Since a punch card contains eighty card columns, it is necessary for each ring on the contact base 25 to contain eighty contacts, and each contact is wired through the electrical connections 24 to one or more of the guide lights G in the panel 22.

Referring now more particularly to FIGURES 4 through 6, panel 22 includes a base 38, upstanding sidewalls 39 and 40, and a top panel 41 having a central recess 42 on which is mounted a transparent sheet 43. As indicated by the sectional view of FIGURE 5 the top panel 41 in its central recess 42 has holes 44 which are aligned with the guide lights G, and as seen in FIGURE 6 there are certain places where the panel 41 is provided with laterally elongated slots such as the slots 45 and 46, the holes and slots providing guide light windows.

When data from a source document D is to be recorded on the series of punch cards J, K and M, the source document is placed in the recess 42 of source document panel 22 overlying the transparent sheet 43, and the switch SJ is moved to "on" position for punching the J card of the series. The arrangement of the holes 44 and the slots 45 and 46 is such that each guide light G, when illuminated, shines through a part of the transparent sheet 43 and through the source document D so as to produce an eye-catching spot of light on the source document. The wiring arrangement is such that, as the program drum 21 rotates to carry the key punch machine M through its predetermined program the operation of the stepping switch 23 illuminates the particular guide light G which is behind the area of the source document D from which data is to be taken for the punch card field or column in which a punch is to be made.

Since the name and mailing address of the producer must appear on all three of the related cards, and is the same for all three, this information, which occupies the first nine columns of the punch card, need not be included in the data to which the operator's attention is directed by illuminating one or another of the guide lights G.

Referring now simultaneously to FIGURES 4 and 14, each of the circles on FIGURE 4 represents one of the windows provided by the holes 44 in top panel 41 of the panel 22. Furthermore, each of the circles in effect represents one of the guide lights G since there is such a light beneath each circle, and substantially in the center of each of the slots 45 and 46 is a guide light G (FIGURE 6).

In FIGURE 14 the area of the source document D from which each item of data for the J card is to be obtained is indicated by a reference letter J, and the punch card field in which that data must be entered is indicated by the numeral following the letter J. As previously stated, the fields contain different numbers of card columns, and the numerals which appear in the windows in FIGURE 4 are formed on the transparent sheet 43 to indicate to the operator the number of columns in the particular field. Thus, the J1 in FIGURE 14 under "St. & Co. Code & Loan or P/A No." indicates that this information goes into the first field of the J card, and in FIGURE 4 the corresponding reference characters J1 indicate the window for the particular guide light G which draws the operator's attention to this part of the source document D. The numeral 5 in the J1 window printed on the transparent sheet 43, and indicates to the operator that the first field of the J card contains five card columns. From this she knows five key operations are required to fill the first field of the J card.

If the actual data for the first field of the J card occupies less than five-card columns, it is necessary for the operator to precede the actual data with enough zeros to fill in the unneeded card columns. Thus, for example, if the data for the first field of card J requires only the numerals 1 and 2 and the letter A, in that order, the operator would actually punch 0012A in order to fill up all five columns in the first field.

With each operation of the key punch machine M the program drum shaft 20 rotates one step, so that in filling the first field of the J card the contact finger 35 moves over the first five of the contacts C1 in the outermost ring J of contacts in the stepping switch 23. All five of these contacts C1 are connected to the guide light G which is beneath the J1 window, so that this particular guide light is illuminated for five consecutive operations of the key punch machine. With the fifth key operation the contact finger 35 moves to the sixth of the contacts C1, and this contact is wired to illuminate the guide light G under the window J2. This window bears the numeral 1 to show the operator that there is only a single card column in the second field of the J card. Reference to FIGURE 14 shows that the second field of the J card receives information from the heading "Commodity" in the source document D.

The further description of the device will be limited to what is observable on FIGURE 4, rather than making specific reference both to FIGURE 4 and to the various boxes and areas of FIGURE 14, it being understood that every "J" window coincides with an area of the source document. Accordingly, it is seen that the third field of the J card also contains a single column, while the fourth field contains five columns which must also be repeated in the first field of the M card, as indicated by the reference M1 which also applies to this window in FIGURE 4.

The fifth field of the J card has eight columns, the sixth field has five columns and the seventh field has eight columns. It is to be remembered that wherever the actual information or data required for a particular field requires less than the total number of card columns in the field, the operator starts out with the necessary number of zeros to use up the card columns not needed for the actual data.

Furthermore, since the punch cards must be standardized and all contain the same number of card columns, and since certain information must be in the first card column and other particular information must be in the eightieth card column, if the maximum amount of data which would ever be entered in the J card requires less than eighty columns it is necessary to enter zeros in the punch card merely to fill space. In the case of the J card there are eleven columns which are never needed for any data, and to simplify machine operation these are scattered among various card columns of the J card. Thus, card column 43 is a zero column, as are card columns 51, 59 to 65, 73 and 74. There is a zero light for the J card which is in the location J0 of FIGURE 4, and at this particular area the transparent sheet 43 is colored red so that the operator can readily recognize that this light is to indicate that a zero must be punched. The location of the zero light with respect to the source document D is indicated at FIGURE 14 by placing a circle and the reference letters J0 on the document. It is seen that this is located outside any area of the document which contains data. When the stepping switch gets to the forty-third contact C1 of the J circuit it illuminates the zero light, and the same thing occurs at the fifty-first contact and at the other contacts representing the other card columns previously mentioned as receiving zeros.

Certain of the fields in the punch card require data from more than one area of source document D, and this condition is indicated in FIGURE 4 by the fact, for example, the J10 indicates two different windows, side by side. Reference to FIGURE 14 shows that both are in the box headed "Itemized Credits (Hauling, Truckloading, Storage, etc.)" under Section 3—Settlement Data of the source document D. This is for the reason that in the tenth field of the punch card there are seven card columns, as indicated by the appearance of the numeral 7 in the righthand window of the J10 field; but there is also a location on the punch card to receive a punch which indicates that there is a cross in the itemized credit box to indicate that the credits require special treatment. If there is such a cross on the source document it registers with the left hand J10 window and becomes visible to the operator as the guide light G under said window is illuminated during all seven of the impulses which illuminate the J10 guide lights.

Similarly J12 indicates three windows, and reference to FIGURE 14 indicates that the primary J12 contains five card columns, while the two J12's near the top of the source document D are to indicate whether there is an X in the box showing that weed control discount is applicable, or in the box showing that non-cooperator rate is applicable. It is apparent from a brief study of FIGURE 14 that the rate basis under "Settlement Data" will be effected by the applicability of the weed control discount and the non-cooperator rate.

The eightieth card column of the J card is the thirteenth card field, and the window for this card column, bearing a letter J, is merely placed immediately adjacent the J12 window and outside any area of the source document containing data to be entered in the punch card, because the only purpose of this window is to cause the operator to enter the card type designation "J" in the eightieth card column.

The foregoing description of the sequence of illumination of the areas of the source document D from which data is obtained for the J card is believed to show very plainly why it is quite difficult to train an operator to perform the necessary key punch operations for the J card; and when it is realized that the operator must also learn the various positions for the K card and the M card, it is apparent that the illustrated source document D is highly complex and presents a very serious training problem.

It will be noted at this point that the first sixteen columns of the K card and the M card duplicate the data contained in the first sixteen columns of the J card. Reference to FIGURES 4 and 14 shows that the first guide light designated field of the K card receives all the information respecting the name, code number and location of the warehouse or other approved storage to which delivery is to be made. The window K1 registers with the slot 46 of the panel. It is seen that most of the remaining data for the K card extends from left to right across the group of boxes under Section 2 of the source document D; but it will also be noted that the numerals do not run in order, i.e., K8 precedes K7, while K11 appears in the box of source document D under "Commodity Credit Corporation," and also appears on both sides of K12 and K13.

The data required for the K card may possibly fill all the card columns; and accordingly there is no reason to have a zero light in the K card circuit.

As previously pointed out, the first field of the M card, containing five-card columns, receives the same information as that in the five-card columns in the fourth field of the J card. The M card does require a zero light, indicated in FIGURE 4 by window M0, and the location of the M0 window on the source document D is shown by the position of the circle M0 in FIGURE 14.

Field M9 contains card column eighty, and the letter M there indicates that the operator is to enter the letter M in the eightieth column as a designation of the card type.

It is believed to be obvious from the previous description that when the K card is being punched the J switch is open, the K switch is closed, and the latter switch and the contact finger 36 bearing upon the contacts in the K circle of the stepping switch are in control of the sequence in which the guide lights are illuminated. Similarly, during punching of the M card the switches SJ and SK are open while the switch SM is closed, and the latter switch and the contact finger 37 bearing upon the contacts C3 in the ring M of the stepping switch are in control of the sequence of illumination of the guide lights.

The operation and use of the form of the device illustrated in FIGURES 1 through 6 is believed to be completely clear from the foregoing detailed description. By varying the arrangement of guide lights G and windows in the source document panel 22, and the connections between stepping switch 23 and the guide lights, the panel 22 may be assembled to accommodate any desired source document.

Turning now to the alternative form of the device illustrated in FIGURES 7 through 10, this form is considerably simpler but does not relate directly to the preparation of punch cards. The device illustrated in FIGURES 7 through 10 is for the purpose of taking data from the same complex source document D illustrated in FIGURE 14, and entering the data in successive lines of a tabulation, or line listing sheet in which it may be entered in longhand.

In the alternative device, the unit includes a base member, indicated generally at 100, which is seen in FIGURE 9 to have an elevated rear wall 101, generally triangular end walls 102, and an inclined top panel 103. Top panel 103 is seen to include a bottom cross member 104, a relatively wide left hand side member 105, a narrow right hand side member 106, and a center bar 107, the members 105, 106 and 107 serving to divide the top panel into a source document panel, or document holding means, indicated generally at 108, and a secondary document panel, indicated generally at 109.

In the particular embodiment illustrated in the drawings, the source document panel 108 is arranged to accomodate a source document such as the document D of FIGURE 14, and accordingly the panel assembly includes an arrangement of guide lights G which are identical with those in the source document panel 22 of the preferred form of the device. Accordingly, the source document panel is not described in any further detail, but in the description of the relationship between the source document panel and the secondary document panel 109, the various windows above the guide lights G will be referred to by the same reference characters as are applied to windows of the source document panel 22.

As seen in FIGS. 7 and 8, the secondary document panel 109 is provided with a column of holes 110, and a transparent sheet 111 overlies the panel and extends across the holes so that they provide columnar windows. Beneath each hole 110 is a light G1, so that each light G1 may be considered to be a columnar light, and each columnar light G1 is wired to one or more of the guide lights G through a circuit that includes a stepping switch, indicated generally at 112.

As best seen in FIGURES 7 and 10, the stepping switch 112 is mounted in a hole 113 in the side frame member 105, and includes a mounting plate 114, a commutator drum 115, and a plurality of contacts C5 which are set in the face member and extend into the hole in which the commutator drum 115 is centered. Surmounting the commutator drum is a knurled operating knob 116 by means of which the commutator drum may be manually turned to move a contact finger 117 successively into electrical contact with the contacts C5. The stepping switch assembly also includes commutator rings 118 on the drum 115 and a commutator brush 119 through which the commutator circuit is completed.

The secondary document panel 109 is intended to receive a secondary document in the form of a data listing sheet 115 which has a data listing line 115a positioned to overlie each of the columnar light windows 110. Each of the lines 115a corresponds to a field of a machine retrieval punch card, and when the operator has a source document such as the source document D positioned on the source document panel 108, and has a line listing sheet positioned on the secondary document panel 109, the stepping switch 112 may be rotated manually to successively close electric circuits through the various contacts C5. The first contact C5 closes a circuit which illuminates the light G1 behind the uppermost columnar light window 110 in FIGURE 7. At the same time, a guide light G beneath the window J1 of the source document panel 108 is illuminated to guide the operator to the location of source document D from which the data for the first line of the line listing sheet is to be obtained. The operator then manually copies the data from the source document on the line listing sheet.

When all the data for the first line of the listing sheet is entered on the sheet, the operator turns the stepping switch to the next contact C5 to close a circuit which energizes a columnar light G1 beneath the second window 110. This illuminates the guide light G behind a window J2 of the source document panel 108, and the operator continues to enter the indicated data from the source document on the line listing sheet step by step as indicated by the illuminated columnar window of the secondary document panel 109 and the illuminated guide window of the source document panel 108.

If, as in the case of the machine retrieval data cards J, K and M, three line listing sheets are required to record all the data from the single source document, the stepping switch must have enough contacts in a single circle for all the lines of three line listing sheets. However, for example, if only two line listing sheets are required then the stepping switch requires only the number of contacts in the whole circle corresponding to the lines in the two listing sheets.

It is apparent from comparison of the system of FIGURE 4, which has three separate circuits controlled by the switches SJ, SK, and SM, that the alternative structure could also have a stepping switch having three parallel commutator bands on the commutator drum 115, and the three circuits controlled by separate switches to complete a circuit through one of the three commutator bands on the drum.

It is also obvious that if more than three secondary documents were required to record all the data from a single source document, more than three circuits might be used either in the preferred or alternative forms of the device so as to provide a separate circuit for each secondary document.

Referring now to FIGURES 11 to 13, a simple apparatus is illustrated for establishing ten separate circuits to a single primary document panel 222, using a single stepping switch which may be power driven like the stepping switch 23 or manually operated like the stepping switch 112. Referring first to FIGURE 13, a switch panel 201 is provided with ten rows 202 of switch contacts S6. Each of the rows 202 contains 80 switch contacts S6, one for each column of a machine retrieval data card.

Referring now to FIGURES 11 and 12, switch panel 201 is seen to include a top panel 203 secured to the underside of which are parallel rack supporting rails 204. Rotatably mounted on panel 203 is a manual switch adjusting knob 205 having a depending spindle 206 on which is a pinion 207. In spaced relationship to spindle 206 is a spindle 208 which is rotatably mounted in the panel 203 and carries a second pinion 209 in mesh with the pinion 207. A pair of gear rack members 210 are slidably mounted in the gear rack brackets 204, and said gear rack members have gear racks 211, one of which is in mesh with the pinion 207 and the other with the pinion 209. Accordingly, if pinion 207 is manually rotated clockwise, as indicated by the arrow on the pinion in FIGURE 11, the pinion 209 will rotate counterclockwise as indicated by the arrow on that pinion, and the two gear racks 210 will move upward as viewed in FIGURE 11.

Secured to the ends of gear rack members 210 is a switch bar 212 having 80 switch contact fingers 213 each of which is aligned with all the correspondingly positioned switch contacts S6 in the rows 202 of switch contacts on switch panel 201. Accordingly switch bar 212 may be positioned with all 80 of its switch contact fingers 213 in contact with the switch contacts S6 in any one of the ten rows 202 of switch contact. Accordingly, each of the rows 202 of switch contacts may be used for wiring a different circuit for primary document panel 222.

Referring again to FIGURE 13, the present alternative arrangement also includes a plug board 214 having ten rows 215 of electric circuit plugs P, there being 80 plugs in each row 215. Each switch contact S6 in the switch panel is wired to a corresponding plug P in the plug board so that, for example, the right hand upper contact S6a in FIGURE 13 is wired to the right hand upper plug Pa in FIGURE 13.

The stepping switch 199 includes a ring of 80 contacts like any one of the rings J, K or M in the stepping switch 23. In FIGURE 13 only a single contact C5 is diagrammatically illustrated for explanatory purposes, and the contact C5 is seen to be connected by a wire 216 to a particular switch contact finger 213e of switch bar 212. Accordingly, when the stepping switch 199 is moved to a point where it closes a circuit through contact C5 it provides a continuous circuit through switch bar contact finger 213e, through a contact S65 of the switch panel, and from switch contact S65 to a corresponding plug P5 in the plug board 214.

As illustrated in FIGURE 13, the source document panel 222 has a generally even distribution of windows as indicated by the distribution of reference numerals 223. As in the case of the panel 22, behind each window is a guide light, and each guide light may be connected by suitable wires to one or more of the plugs P in the plug board. Thus, for example, a guide light behind window 223e has an electric lead 224 to plug P5, which in turn is connected by wire 225 to the contact S65 of the switch panel. A common ground is also provided, and a ground wire 226 completes the circuit for the guide light behind window 223e by connection to the common ground. Each guide light in the panel 222 is also connected to the common ground.

It is apparent from the foregoing description of the form of the device illustrated in FIGURES 11 to 13 that the source document panel 222 is of a more or less universal type and may be wired through the plug board 214 and switch panel 201 to provide a device which may be readily adjusted to handle any one of ten different secondary documents, whether those secondary documents are intended to receive data from a single source document or from ten different source documents. Accordingly the switch panel 201 and the plug board 214 cooperate to provide control means comparable to that provided by the manual switches SJ, SK and SM and their respective electrical connections to the rings J, K and M in the form of the device illustrated in FIGS. 1 through 6.

The foregoing detailed description is given for clearness of understanding only and no unnecessary limitations are to be understood therefrom, for some modifications will be obvious to those skilled in the art.

I claim:
1. Programming apparatus adapted to aid an operator to transpose data from source documents to secondary documents, such apparatus being adapted to aid in such transposition from a plurality of different source documents in accordance with a single program and also from a single source document in accordance with a plurality of programs, said apparatus comprising:
   (1) a viewing station adapted to hold a source document in a predetermined, fixed position;
   (2) means for illuminating any of a large number of small, predetermined areas on said source document when held at said station in said position;
   (3) circuit means adapted to actuate said illuminating means to illuminate any of said areas;
   (4) programming apparatus for controlling said circuit means to operate said illuminating means in predetermined sequence, said programming apparatus comprising a plurality of programming means each adapted to control said circuit means for operation of said illuminating means in a different predetermined sequence; and
   (5) means for rapidly shifting from one to another of said programming means to activate any selected programming means and to inactivate others.

2. The apparatus as defined in claim 1 wherein the illuminating means is in the form of a plurality of lamps occupying fixed positions in relation to said viewing station and said circuit means is adapted to illuminate any of said lamps.

3. The apparatus as defined in claim 1 where said programming apparatus is in the form of a plurality of programming circuits comprised within said circuit means and each adapted to actuate said illuminating means in accordance with a predetermined program differing from the programs of the other of such programming circuits, and switch means for activating any of said programming circuits and for inactivating the remaining programming circuits.

4. The apparatus of claim 3 wherein said programming circuits include stepping switches each having a set of contacts for each program and said switch means is operable to select any of said sets of contacts and to inactive the other sets of contacts.

5. In combination:
   (1) a data processing machine having a manually operable keyboard adapted to be operated by a human operator in transposing data from a source document to a secondary document and having also a programming element which passes through a cycle of operation during each cycle of operation of the keyboard, and (2) a programming apparatus adapted to aid such operator in operation of the keyboard, said programming apparatus comprising:
   (a) a viewing station adapted to hold a source document in a predetermined, fixed position;
   (b) means for illuminating any of a large number of small, predetermined areas on said source document when held at said station in said position;
   (c) circuit means adapted to actuate said illuminating means to illuminate any of said areas;
   (d) programming apparatus operated in cooperation with said programming element of said data processing machine for controlling said circuit means to operate said illuminating means in predetermined sequence, said programming apparatus comprising a plurality of programming means each adapted to control said circuit means for operation of said illuminating means in a different predetermined sequence; and
   (e) means for rapidly shifting from one to another of said programming means to activate any selected programming means and to inactivate others.

6. The combination of claim 5 wherein said illuminating means is in the form of a plurality of lamps occupying fixed positions in relation to said viewing station and said circuit means is adapted to illuminate any of said lamps.

7. The combination of claim 5 wherein said programming apparatus is in the form of a plurality of programming circuits comprised within said circuit means and each adapted to actuate said illuminating means in accordance with a predetermined program differing from the programs of the other of such programming circuits, and switch means for activating any of said programming circuits and for inactivating the other of said programming circuits.

8. The combination of claim 7 wherein said programming circuits are in the form of stepping switches having a set of contacts for each program and said switch means is operable to select any one of said sets of contacts and to inactivate the other sets.

9. In combination:
   (1) a key punch machine having a keyboard and a rotary program drum and adapted to be operated by means of said keyboard to transpose data from a source document to a secondary document, said program drum rotating during operation of the keyboard, and
   (2) a programming apparatus adapted to aid the keyboard operator in transposing data from a source document to a secondary document, said apparatus comprising:
     (a) a viewing station adapted to hold a source document in a predetermined fixed position;
     (b) means for illuminating any of a large number of small, predetermined areas on said source document when held at said station in said position;
     (c) circuit means adapted to actuate said illuminating means to illuminate any of said areas;
     (d) programming apparatus operated in unison with rotation of said program drum for controlling said circuit means to operate said illuminating means in predetermined sequence, said programming apparatus comprising a plurality of programming means each adapted to control said circuit means for operation of said illuminating means in a different predetermined sequence; and
     (e) means for rapidly shifting from one to another of said programming means to activate any selected programming means and to inactivate others.

10. The combination of claim 9 wherein said illuminating means is in the form of a plurality of lamps occupying fixed positions in relation to said viewing station and said circuit means is adapted to illuminate any of said lamps.

11. The combination of claim 9 wherein said programming apparatus is in the form of a plurality of programming circuits comprised within said circuit means and each adapted to actuate said illuminating means in accordance with a predetermined program differing from the programs of the other of such programming circuits, and switch means for activating any of said programming circuits and for inactivating the other of said programming circuits.

12. The combination of claim 11 wherein said programming circuits include stepping switches having a set of contacts for each program and said switch means is operable to select any one of said sets of contacts and to inactivate the other sets of contacts.

References Cited by the Examiner

UNITED STATES PATENTS

| | | | |
|---|---|---|---|
| 450,615 | 4/91 | Delaney. | |
| 927,018 | 7/09 | Ammen | 40—106.52 |
| 1,114,633 | 10/14 | Neidig | 197—189 |
| 1,346,493 | 7/20 | Hammond et al. | 40—106.52 |
| 1,641,609 | 9/27 | Stohequist et al. | 40—106.52 |
| 1,719,518 | 7/29 | Nissen et al. | 40—132 |
| 1,849,643 | 3/32 | Seasongood et al. | |
| 2,312,138 | 2/43 | Watson | 35—5 |
| 2,577,955 | 12/51 | Dixon | 200—16 X |
| 2,811,072 | 10/57 | Isaacson | 84—478 |
| 2,909,956 | 10/59 | Radcliffe | 84—478 |
| 2,971,692 | 2/61 | Hetherington et al. | 234—40 |
| 3,054,556 | 9/62 | Silverman et al. | 40—132 X |

FOREIGN PATENTS 762,367   11/56   Great Britain.

L. WILLIAM VARNER, *Primary Examiner.*

LEO SMILOW, LAWRENCE CHARLES, JEROME SCHNALL, *Examiners.*